United States Patent
Matheson

(10) Patent No.: US 7,024,368 B1
(45) Date of Patent: Apr. 4, 2006

(54) MAN-MACHINE DIALOGUE SYSTEM, CONTROLS DIALOGUE BETWEEN SYSTEM AND USER USING DIALOGUE SPECIFICATION EMPLOYING AUGMENTED TRANSITION NETWORKS PROPAGATING TOKENS

(75) Inventor: Caroline Matheson, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/936,623

(22) PCT Filed: Feb. 11, 2000

(86) PCT No.: PCT/GB00/00441

§ 371 (c)(1),
(2), (4) Date: Feb. 13, 2002

(87) PCT Pub. No.: WO00/55843

PCT Pub. Date: Sep. 21, 2000

(30) Foreign Application Priority Data

Dec. 3, 1999 (EP) .................................. 99301883

(51) Int. Cl.
*G10L 15/22* (2006.01)
(52) U.S. Cl. ...................................... 704/275; 704/257
(58) Field of Classification Search ................ 704/257, 704/270, 275
See application file for complete search history.

(56) References Cited

U.S. PATENT DOCUMENTS 4,688,195 A * 8/1987 Thompson et al. ........... 706/11
5,379,366 A * 1/1995 Noyes .......................... 706/55
5,577,165 A * 11/1996 Takebayashi et al. ....... 704/275
5,594,837 A * 1/1997 Noyes .......................... 706/55
5,694,558 A   12/1997 Sparks et al. ............... 395/326
5,937,400 A * 8/1999 Au .............................. 706/55
6,044,347 A * 3/2000 Abella et al. ............... 704/275
6,246,981 B1 * 6/2001 Papineni et al. ............ 704/275
6,510,411 B1 * 1/2003 Norton et al. .............. 704/254

OTHER PUBLICATIONS

Poon, A. D. et al. "Augmented Transition Network as a Representation for Knowledge-based History-Taking Systems" Sixteenth Annual Symposium on Computer Applications in Medical Care, Baltimore, MD, USA, Nov. 8-11, 1992, pp. 762-766.
Alty, J. L. et al. "Microtechnology and User Friendly Systems—The Connect Dialogue Executor". Journal of Microcomputer Applications, Oct. 1985, UK, Vo. 8, No. 4, pp. 333-346.

* cited by examiner

*Primary Examiner*—Abul K. Azad
(74) *Attorney, Agent, or Firm*—Linda P. Ji; Westman, Champlin & Kelly

(57) ABSTRACT

A man-machine dialogue system employing an interactive computer system comprising an input device for receiving input from the user. An output device generating output to the user. There is provided an object system which is an information source or store, or a command and control device. The system has a dialogue manager, which orchestrates the dialogue between the object system and user dependent upon a dialogue specification. The specification employs a set of augmented transition networks (ATNs), through which are propagated one or more tokens, the token comprising a set of fields which together define the current state of belief of the dialogue controller, dependent upon the preceding user-system interchanges and information obtained from the object system.

20 Claims, 4 Drawing Sheets

MAN-MACHINE DIALOGUE SYSTEM, CONTROLS DIALOGUE BETWEEN SYSTEM AND USER USING DIALOGUE SPECIFICATION EMPLOYING AUGMENTED TRANSITION NETWORKS PROPAGATING TOKENS

CROSS REFERENCE TO RELATED APPLICATION

The present application is a national stage filing of and claims priority of International patent application Serial No. PCT/GB00/00441, filed Feb. 11, 2000, and published in English the content of which is hereby incorporated by reference in its entirety.

BACKGROUND OF THE INVENTION

This invention relates to an man-machine dialogue system and a method for realising the same. The techniques proposed here can be applied to diverse input and output modalities, for example, graphics devices and touch sensitive devices, but a particular example of this invention is spoken dialogue systems, where system and user communicate primarily through speech.

Speech generation and recognition technology is maturing rapidly, and attention is switching to the problems associated with the use of such technology in real applications, particularly in applications which allow a human to use voice to interact directly with a computer-based information control system. Apart from the simplest of cases, such systems involve a sequence of interactions between the user and the machine. They therefore involve dialogue and discourse management issues in addition to those associated with prompting the user and interpreting the responses. The systems are often referred to as spoken dialogue systems (SDS).

Examples of interactive speech recognition systems are telephone directory systems, travel information and reservation systems, etc. With such systems information is obtained from a user by recognising input speech that is provided in response to prompt questions from the system.

The key issues in designing an SDS are how to specify and control the dialogue flow; how to constrain the recogniser to work within a limited domain; how to interpret the recognition output; and how to generate contextually appropriate responses to the user. The design criteria which motivate the solutions to these issues are many and varied but a key goal is to produce a system which allows a user to complete the required tasks quickly and accurately.

In recent years many attempts have been made to realise such systems with varying degrees of success.

Today's state-of-the-art dialogues aim to understand "natural language" responses by users and typically use a mixed initiative approach, in which the user is not constrained to answer the system's direct questions. For example, in response to the question "Where do you want to go to?", a user should be allowed to say "To Edinburgh tomorrow evening". This answers the direct question and anticipates a later question. The approach has a number of consequences. It means, for example, that recognition accuracy must be high and parsing algorithms sophisticated in order to interpret what the user says. It raises problems with respect to the modularity and re-usability of dialogue sub-components. It can cause serious instabilities in the system due to increased chances of misunderstanding caused by recognition inaccuracies. Lastly, however much care is put into the design of such systems, misunderstandings will inevitably arise, and the system will be required to backtrack, a non-trivial process in complex systems.

A further problem associated with such systems is that they can be highly labour intensive to develop and test, making them expensive to install and maintain.

Current approaches to dialogue control are varied but typically involve the use of specification using flow-charts and run-time control based on some form of augmented transition network. Essentially, this consists of a set of states linked together by directional transitions. States represent some action of the SDS, such as a question/answer cycles, data processing, simple junctions or sub-dialogues which expand to other networks. Transitions, and their associated transition conditions, determine the course of dialogue flow after the state has been executed.

Similar networks may also be used in SDS in order to provide syntactic constraints for speech input. Grammatical rules may be expressed in the form of finite state networks. Again these consist of states and transitions, but in this case the states represent some acoustic phenomenon, such as a word, to be matched with incoming speech data, or, as before, sub-networks or simple junctions.

Speech output is typically derived from a simple text string which is then translated by the output device into spoken speech by using some form of text-to-speech algorithm or by concatenating previously recorded acoustic waveforms. This may be represented as a very simple network with a single permissible path and each output word representing a state.

SUMMARY OF THE INVENTION

According to the present invention, there is provided a man-machine dialogue system employing an interactive computer system comprising:
    an input device for receiving input from a user;
    an output device for generating output to a user;
    an object system which is an information source or store, or a command and control device, the object of the dialogue being to interface between this system and user;
    a dialogue manager, which controls the dialogue between the object system and user dependent upon: a dialogue specification, comprising a set of augmented transition networks (ATNs), through which are propagated one or more tokens, each token comprising a set of fields which together define the current state of belief of the dialogue controller, dependent upon the preceding user-system interchanges and information obtained from the object system.

A corresponding method is also provided. Furthermore, a tool for generating a system of the type described above is also provided.

The central theme of this application relates to the many advantages to be gained from implementing an SDS as a process of passing tokens around an augmented transition network embracing the dialogue, input and output networks noted above. If the token embodies the current state of knowledge of the SDS, this provides a consistent means of propagating knowledge in a way that is independent of the different functionalities and underlying algorithms associated with these network states.

It now becomes straightforward to embed dialogue components (sub-dialogues) in other applications, or to interface to non-speech APIs from the SDS. The problems of modularity caused by mixed initiative dialogue approaches are largely solved since information which pertains to other sections of the dialogue may be invisibly transferred in and out of dialogue sub-components by the token. Additionally, the precise history of the dialogue is recorded and formally obtainable by the system designer.

Since recognition states are also traversed by the token, extracting the semantics of natural dialogue responses is straightforward. Furthermore, when the acoustic score is modifiable by the attached actions, the method allows such knowledge to be applied to the recognition process itself. Consequently, many things which have not hitherto been possible, or required expensive and varied ad-hoc techniques, are made possible by this approach. These include the application of non-context-free semantic constraints, semantic class modelling, stable error-correction procedures and the possibility of incorporating prosodic cues into the recogniser.

Lastly, the inclusion of output states into the augmented network means that recent advances in barge-in technology (barge-in is the process whereby a user is allowed to interrupt system output) can be put to greater effect, since the recognition process can be made fully aware of the point in the speech output at which the user started to respond.

The token may be copied and updated where necessary through each state in the augmented transition network as the dialogue controller passes therethrough, so that the route to a current position in the network can be traced.

BRIEF DESCRIPTION OF THE DRAWINGS

On example of the present invention will now be described with reference to the accompanying drawings, in which.

DETAILED DESCRIPTION OF THE PREFERRED EMBODIMENTS

Figure 1:
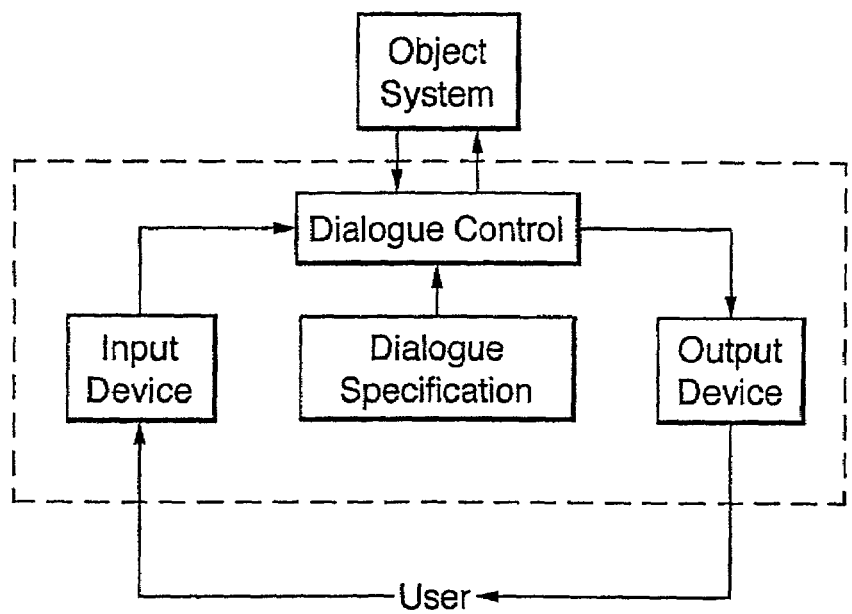
FIG. 1 is a schematic diagram showing the structure of a system according to the present invention.

The main components of a system according to the present invention are illustrated in FIG. 1. Overall operation is controlled by dialogue control means 1 according to an application-specific dialogue specification the function of which is to exchange information with a user and access, update, or otherwise exercise control over an object system 3. User interaction consists of a sequence of question/answer cycles where each question is designed to elicit some specific information. Output is generated by means of a generator, in this example a speech output generator. The response of the user is processed by the input device 4, in this example, a speech recogniser. Based upon any input the dialogue control means 1 updates its internal control state and determines the next action of the system. This continues until the information need of the user is satisfied and the interactive operation is terminated.

An alternative scheme, for which this system is equally applicable, is where the overall control is vested with the target system 3, and this calls on the dialogue control means 1 to invoke a particular sub-dialogue specified by 2.

Figure 2:
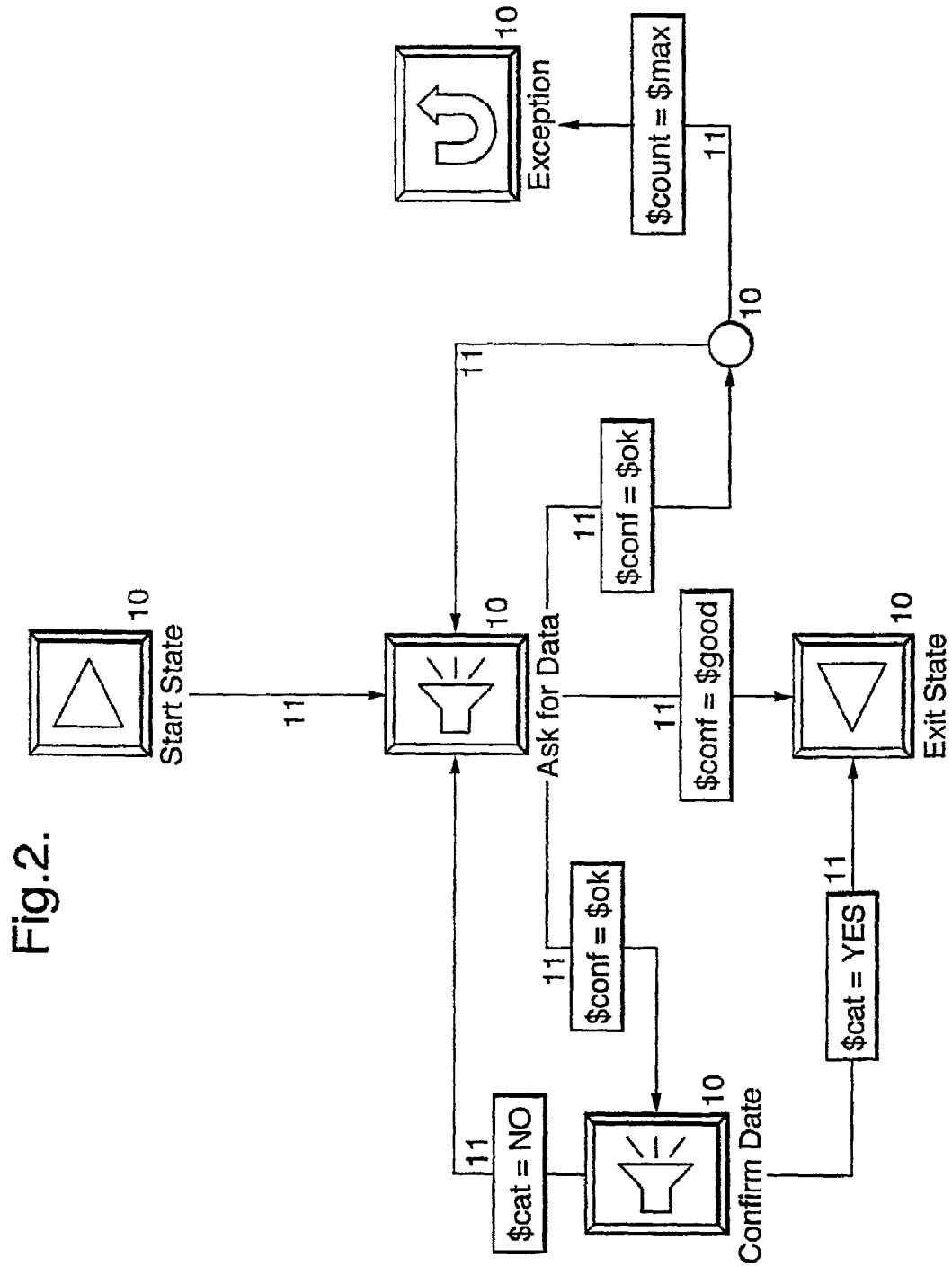
FIG. 2 is a schematic diagram showing a transition network that represents a simple sub-dialogue whose function is to elicit a date from the user.

The dialogue control means 1 employs augmented transition networks specified in the specification 2 to control the operation of the system. FIG. 2 shows an example of such a network, which represents a simple sub-dialogue, the function of which is to obtain a date from a user. Basically, it consists of a set of states 10 linked together by directional transitions 11. The states 10 represent a system action, such as a question/answer cycle, data processing, a simple junction, or a sub-dialogue state, which expands to another similar network. The transitions 11, and their associated conditions, determine the course of dialogue flow after a particular state 10 has been reached and executed.

A similar network is also used in the system in order to provide syntactic constraints for speech input. In this case, grammatical rules may be expressed in the form of finite state networks, such as the "date" network shown in FIG. 3. Again, there are states 10 and transitions 11, but in this case the states represent an acoustic phenomenon such as a word, to be matched with incoming speech data, or, as before, sub-networks or simple junctions.

Speech output is typically derived from a simple text string which can translated by the speech output device 5 into speech. This can be done by using a simple, well known, text-to-speech algorithm, or by joining together previously recorded acoustic wave forms. In the current system this is preferably treated as a very simple network with a single permissible path, and with each output word representing a state 10.

Employment of the above structure means that all states, whether associated with speech output, speech input, or overall dialogue control, can be associated with an action or actions 12, each of which is a simple procedural form specified by the system designer. This, in turn, allows the provision of action which receives, modifies, and then forwards, a token. The token is an object which contains information embodying the current state of knowledge of the system, and a link to its predecessor, from which the history of the dialogue up to the point of the action in question can be obtained. The token should consist in part of a set of fields that are known and modifiable by the previously defined control means 1, input device 4 and output device 5, and which are also accessible to the application-specific actions 12 and transition conditions 11. For example, recognition and confidence corresponding to speech input, or the count of the number of times that a dialogue state has been traversed. In addition the token has a further set of fields which may be specified by a system designer, known and modifiable by the application specific actions attached to the states 10 and transition conditions 11. The token is arranged to be propagated according to the transitions in the network in the system and is copied to state actions. Copying varies upon the context of the state action.

For example, in the case of dialogue, propagation occurs as and when states are encountered (as dictated by transition conditions), based on token fields. When the dialogue system is embedded within another application, as can be the case with this system, the token is passed by the calling application to the entry state of the sub-dialogue and copied back from the exit state on completion of the dialogue.

For the states which require a user interaction the token is copied to the initial state of the speech output.

For speech output, copying occurs synchronously with the speech output itself, but a token exiting any speech output state is also transmitted to the start of the speech recognition network. In the case of speech input, each token is copied time-synchronously for each incoming token and for each hypothesis (i.e. for each alternative path through the input network) as and when it is considered by the recogniser. During recognition, competing tokens arriving at the same state can be recombined according to a simple comparison of sets of fields nominated by a system designer. Such fields may represent the semantics of a particular utterance. At the end of recognition, only the best scaring token is re-transmitted to the dialogue network following therefrom.

The employment of tokens of the above type and the passage of them through the whole operation of the system, not solely from the speech recognition, speech output, or dialogue control, has considerable advantages.

For example, unless complex systems are broken down into independent sub-components which interface in a well-defined way with the rest of the system, design of such systems is time consuming and complex. Development time and complexity can be reduced, however, by developing and testing sub-components separately and then combining them. This is difficult to do, however, and still ensure that the interface definitions do not have to be restructured, making modularity difficult to achieve in practice. Furthermore, dialogues are often implemented in such systems using conventional programming language variable scoping. This leads to much of the knowledge of a system being implemented as some form of global variable, as this is often the simplest way to make sure that all components of a dialogue have access to the appropriate knowledge. With this, however, modularity is lost, and sub-dialogues cannot straightforwardly be extracted from one system and plugged into another, as there will not be a consistent set of global variables. In addition, global variables, once updated, lose all information pertaining to previous settings, meaning that it is difficult to obtain back tracking information without explicit result saving, which can be complicated and error-prone.

The arrangement of the present invention overcomes these problems. Dialogue sub-components may specify an interface in terms of token fields which are intended for import/export to the rest of the system and may also maintain a set strictly local to the sub-components. All other fields are still transferred by the token, but invisibly to sub-components which do not explicitly import them. This means, for example, that extra, unelicited, information that may be supplied by a user in mixed initiative dialogues, such as the time of day in a response "to Edinburgh this evening", can be carried forward through the dialogue until a sub-component that recognises the extra information, in this case, a time, can be found.

In addition, and most importantly, the system of the invention means that the current state of knowledge at all stages of the dialogue is known, given that the token is copied from state to state, and can therefore be regained as required. This is useful during debugging of a system in development, in backtracking during operation, and for the provision of a formal history mechanism, whereby the application designer can pose arbitrary questions concerning previous utterances in the history of the dialogue.

There are additional features that can be provided in the system once the employment of tokens of the type described above is realised.

Figure 3:
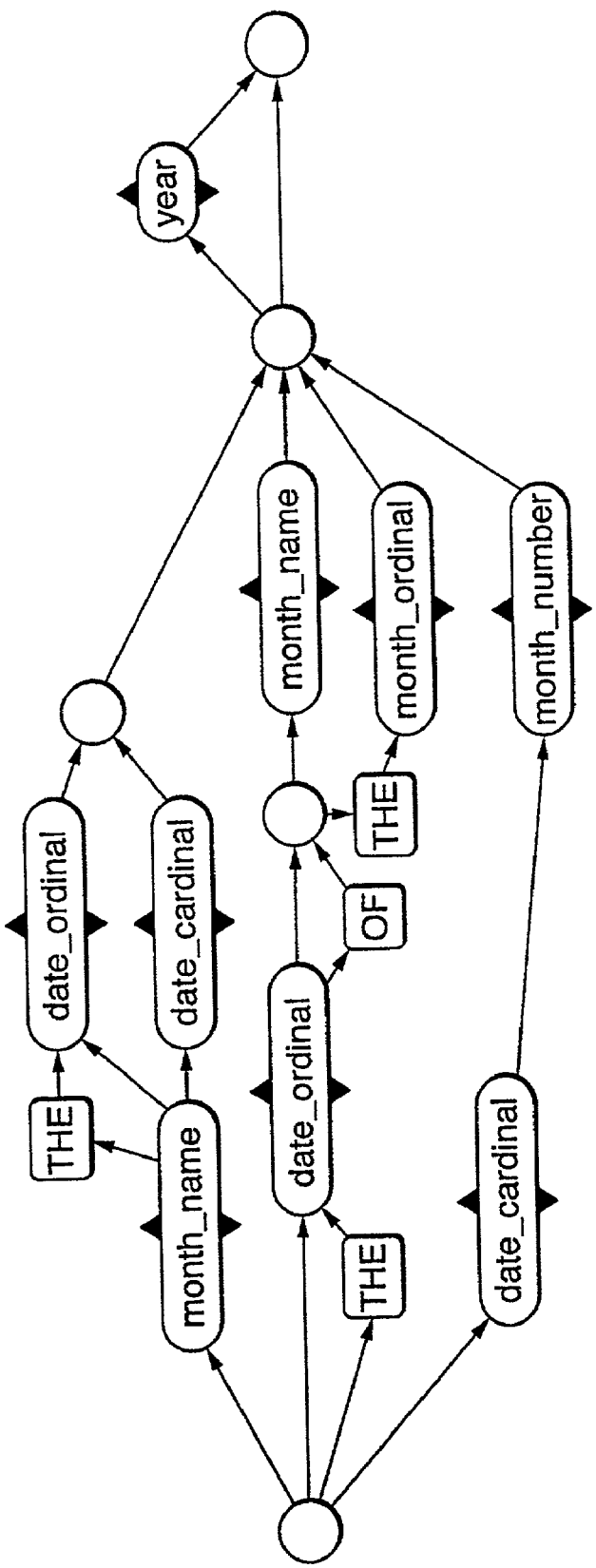
FIG. 3 is a schematic diagram of a transition network representing a simple sub-syntax describing the different ways in which the user may specify a date.
Figure 4:
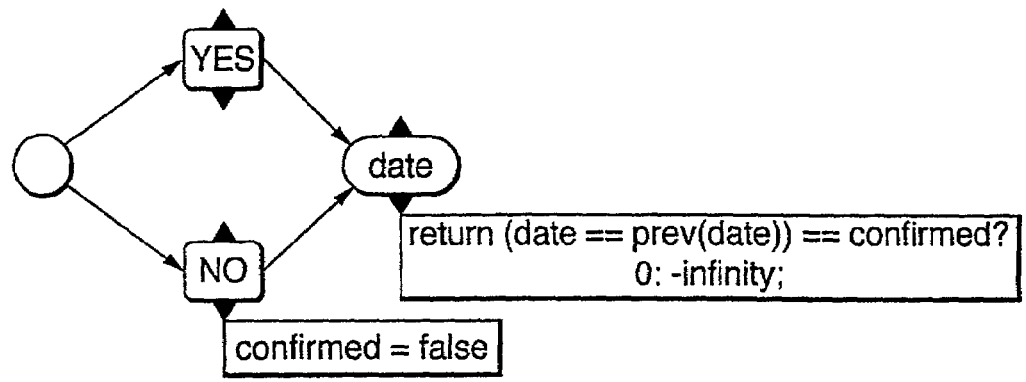
FIG. 4 is a schematic diagram of a semantic operations.

A first example is the extraction of knowledge from recognition results. In prior art systems there is often a substantial post-processing phase, often involving sophisticated parsing techniques, which now becomes simple with the system and method of the present invention. In effect, this is because the parsing is now performed by the speech recogniser. In FIG. 3 specific states have black triangle marks which indicate that they have a semantic action 12 attached. A typical action might be associated with a time sub-syntax state. Before the action is taken, the system fills in the recognition and confidence fields of the associated token with an actual recognition, such as "at half past 5". In this example hour and minute have already been set during traversal of the time syntax, and the action simply records the time, and the confidence for the whole of the time utterance. The syntactic variant employed by the user (that is "at half past 5", as opposed to "5.30", "17.30", etc), is also recorded in this example, and this may then be used in the confirmation procedure. It is important to note that with the system of the invention the confidence of any selected part of the input can be obtained trivially, an advantage for the application designer in assessing the confidence with which the semantics of a user-utterance should be held, and also meaning that, when expedient, it is possible to restrict explicit confirmation only to those sections of the input which are uncertain.

Another example is the employment of dialogue knowledge to guide the recogniser. It is common for constraints on the recogniser to be syntactic, and to take the form of the grammatical rules of the language being recognised. Unfortunately, in practice spoken dialogue is often not so closely tied with grammatical rules, and constraints must be loosened in order to accommodate a more natural dialogue style, reducing recognition accuracy. With the system of the present invention, however, additional semantic constraint can be employed.

Figure 5:
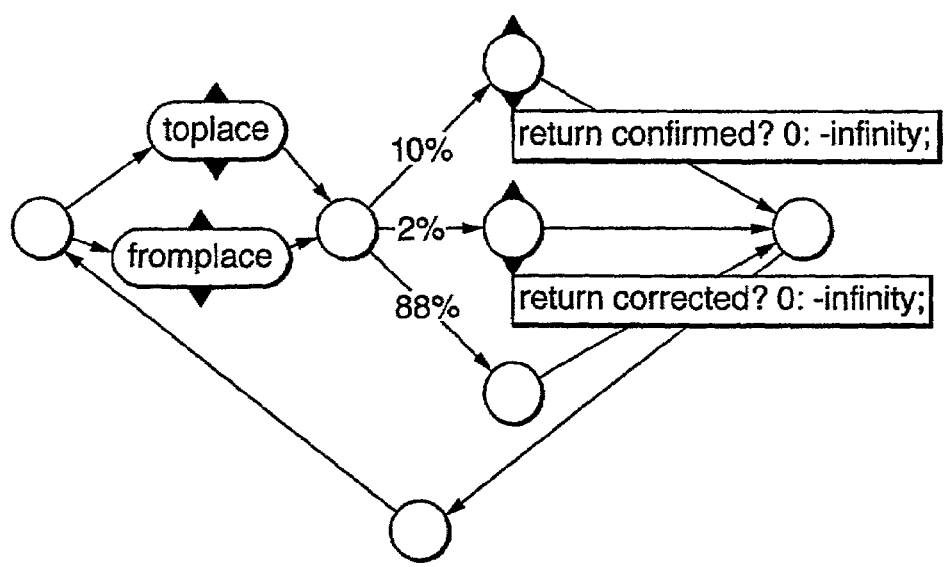
FIG. 5 is a schematic diagram of a further semantic operation.

Semantic constraints relate to the meaning of an utterance, and are rarely broken by well-motivated users. For example, a speaker is unlikely to say "I wish to travel to London from London", "February 31", or to reply to a question such as "Do you want to leave on Sunday morning?" with "No. I want to leave on Sunday morning.". Typically, such constraints are non-context-free, and cannot be applied using conventional syntax networks without considerable inconvenience and difficulty. Using the present method of invention, however, these sort of constraints can be applied strictly without compromising natural responses generated by the system. Recognition can return a score which is then added by the system to the acoustic likelihoods employed in the recognition, which can simply turn paths on or off depending upon the semantics denoted by field defined by a system designer. FIG. 5 shows a simple example of this for a confirmed date syntax, where a return value of zero means that a pass is unaffected by semantic constraint, and a return value of the infinity that the path is forbidden.

Related to the above is the employment of semantic classification statistics. In recent years significant advantages in speech recognition have been achieved by the application of statistics to the use of dialogue and to the order in which words are spoken, with the statistical probability adjusting the raw acoustic scores produced by the speech recogniser. For the "date" syntax shown in FIG. 2 the employment of such a technique would involve the association of probabilities with the various paths 11 through the network, the probabilities corresponding to the frequency with which the path is selected and hence the frequency with which a particular syntactic form is selected by users in order to specify a date. Similarly, if the user is permitted to enter several different items, date, times, place, etc, in one utterance, the order in which these items tend to be specified can be recorded as similar statistical processing applied. In practice, however, such processing is limited to relationships which can be expressed in terms of a conventional context-free grammar. In interactive dialogues, there is a common tendency for users to confirm information already supplied by repeating it within the same utterance or at a later stage in the dialogue. This tendency cannot be modelled by conventional context-free grammars, and so much statistical information is lost.

With the method and system of the invention this problem can be solved. For example, consider the two responses: "to London—to London from Manchester" and "To London—to Durham from Manchester". Syntactically they are identical consisting of two "to place" sub-syntaxes followed by "from place", and would be assigned the same weight using conventional probabilistic syntactics. Semantically, however, they are very different, the first representing a confirmation of a previous assertion, and the second a correction. FIG. 5 shows how these cases can be distinguished by assigning different paths for each and then using collected data to assign probabilities to the path, in a simple conventional manner.

The system and method of the present invention also enables the propagation of acoustic likelihoods. Dialogues usually involve several interchanges between a user and a system. For each user utterance acoustic scores are available which support (or reject) the various hypotheses that the system might make about the user's intentions, for example that the user wishes to travel to a certain place. These constitute independent pieces of evidence for or against an initial hypotheses and as such can be combined using Bayesian statistics, so that the probability of a hypotheses becomes ever more certain (or remote) as the system proceeds from utterance to utterance. The system and method of the present invention can perform this simply by transferring appropriate information via the token or tokens passing through the system. Prior art systems do not work so easily, however. For each utterance, recognition starts afresh, considering all earlier hypotheses as equally likely.

An example of the advantages provided in relation to this is in relation to error correction. A dialogue can become very long and tedious if every piece of information must be explicitly confirmed. If such confirmation is not employed, however, the user must be able to correct selected items presented to them by the system. This means that syntax constraints must be very wide, leading to a high chance of false correction. With the present invention this problem disappears because the system can accumulate hypotheses, probabilities based on previous utterances and can use them to weight future recognition results. This in turn has benefits in that a number of irreversible decisions the system designer must make are in use. For example, because a hypotheses is supported by some high confidence level in the prior art the designer may be required to accept such hypotheses as true, but with the system and method of the present invention of course assumptions can also be rectified without compromising overall system ability.

A yet further benefit of the present invention is that a consistent way is provided in which the system can be configured to employ other knowledge sources which might typically be used to assist recognition. Humans use this extensively to aid understanding. For example a likelihood of a particular event can be improved with a travel or directory enquiry given the knowledge that a caller's home city is more likely to be involved in the enquiry than any other city. Other acoustic clues, such as prosody can also be employed. For example, if a user is confirming a set of correct digits, but puts emphasis on digits which are currently recognised wrongly it has considerable benefits if the system is able to access some measure of the emphasis applied. This can be arranged simply with the invention by employment of the tokens.

A yet further example of the benefits of the present invention is the employment of "barge-in". Barge-in has became very popular in SDS. Users are allowed to interrupt system output, perhaps to contradict a false statement, or simply to anticipate the question. Barge-in is, however, highly problematical. Recognition is not so good, non-speech noises, such as coughing, can produce an unwanted interrupt, and responses are very difficult to understand without knowing quite precisely when, in relation to the output, the user interrupted the system.

With the system and method of the present invention, by the explicit flow of tokens from output states to the start of the recognition network, these problems can ameliorated. Different recognition syntaxes may be employed for interruptions, and explicit action may be taken to compensate for the increased unreliability of recognition in such the circumstances.

The invention claimed is:

1. A man-machine dialogue system comprising an interactive computer system with:
   an input device for receiving speech input from a user;
   an output device for generating output to a user;
   an object system which is an information source or store, or a command and control device, the object of the dialogue being to interface between this system and a user, wherein the object system further comprises knowledge sources to assist recognition;
   a dialogue manager, which controls the dialogue between the object system and a user comprising:
      a dialogue specification applied to the speech input from the user during recognition comprising:
         a set of augmented transition networks (ATNs), having a set of states, wherein each state is one of a question/answer cycle, data processing, a simple junction, and a sub-dialogue state;
         one or more tokens propagated through the states, each token comprising a set of fields which together define a current state of belief of a dialogue controller, dependent upon the preceding user-system interchanges and information obtained from the object system.

2. A system according to claim 1, further comprising means for copying and updating the token through each state in an ATN as the dialogue controller passes therethrough.

3. A system according to claim 2, wherein each token is linked to its predecessor, so enabling the dialogue controller to regain a previous state of data maintained at some point during the history of the dialogue.

4. A system according to claim 1, wherein a token or tokens can be received, modified, and transmitted at each state.

5. A system according to claim 1, employing an ATN to specify the course of the dialogue, and wherein each state may represent a junction, a system action, such as a user interaction, or an embedded dialogue represented by a further augmented transition network.

6. A system according to claim 1, where the input device is a speech recognizer.

7. A system according to claim 1, where the input device is constrained by a set of statistical grammars which may be defined using an ATN.

8. A system according to claim 7, wherein each of the states may represent a junction, a terminal state, such as a word or other acoustical phenomenon, or an embedded statistical grammar represented by a further ATN.

9. A system according to claim 7, wherein tokens are propagated for the user-interaction dialogue state to the start of the input network, and through a best matching path of the input network back to the user-interaction dialogue state.

10. A system according to claim 7, wherein a token is propagated for each alternative input hypothesis considered by the input device, and the score assigned to the hypothesis is a modifiable field of the token.

11. A system according to claim 1, wherein the output device is a speech generator.

12. A system according to claim 1, wherein user output is represented by an augmented transition network.

13. A system according to claim 11, where the states represent an output word or other acoustical or linguistic phenomenon.

14. A system according to claim 12, wherein tokens are propagated from the dialogue user-interaction state to the first user output state, and from each user output state to the start of the input network.

15. A system comprising: an output device for generating output to a user;
an input device for receiving input from a user;
a tool for generating an object system which is an information source or store, or a command and control device, the object of the dialogue being to interface between the system and the user; and
a dialogue manager, which controls the dialogue between the object system and the user based upon: a dialogue specification, comprising a set of augmented transition networks (ATNs), having a set of states through which are propagated one or more tokens, wherein each state is one of a question/answer cycle, data processing, a simple Junction, and a sub-dialog state, and wherein each token comprises a set of fields which together define a current state of belief of a dialogue controller, dependent upon the preceding user-system interchanges and information obtained from the object system.

16. A method for controlling dialogue between a computer system and a human user comprising the steps of:
outputting at least one speech signal to the user;
inputting a speech signal from the user in response to each of the at least one speech signal output to the user;
propagating at least one token over a set of augmented transition networks comprising a set of states, wherein each state is one of a question/answer cycle, data processing, a simple junction, and a sub-dialogue state, wherein propagating comprises:
applying a dialogue specification to the speech signal input from the user; and
updating the at least one token over the set of augmented transition networks, each token comprising a set of fields which together define a current state of belief of a dialogue controller, dependent upon the preceding user-system interchanges and information obtained from the object system.

17. The method of claim 16, wherein generating output to the user comprises asking the user a question, and wherein receiving input from the user comprises receiving the user's answer to the question.

18. The method of claim 16, wherein propagating comprises propagating a token for each alternative hypothesis being considered, and further comprising scoring each alternative hypothesis based on a best matching path through the augmented transition network.

19. A computer-readable medium including instructions readable by a computer which, when implemented perform steps comprising:
generating a speech-based output to the user;
receiving a speech-based input from the user in response to the generated speech-based output;
propagating at least one token over a set of augmented transition networks, wherein propagating comprises:
applying a dialogue specification to the speech signal input from the user; and
updating the at least one token over the set of augmented transition networks comprising a set of states, wherein each state is one of a question/answer cycle, data processing, a simple junction, and a sub-dialogue state, and wherein each token comprises a set of fields which together define a current state of belief of a dialogue controller, dependent upon the preceding user-system interchanges and information obtained from the object system.

20. The computer readable medium of claim 19, wherein each token further comprises a link to its predecessor, from which the history of the dialogue is obtainable.

* * * * *